No. 611,429. Patented Sept. 27, 1898.
A. W. HALL.
BICYCLE.
(Application filed Jan. 4, 1898.)
(No Model.) 2 Sheets—Sheet 1.
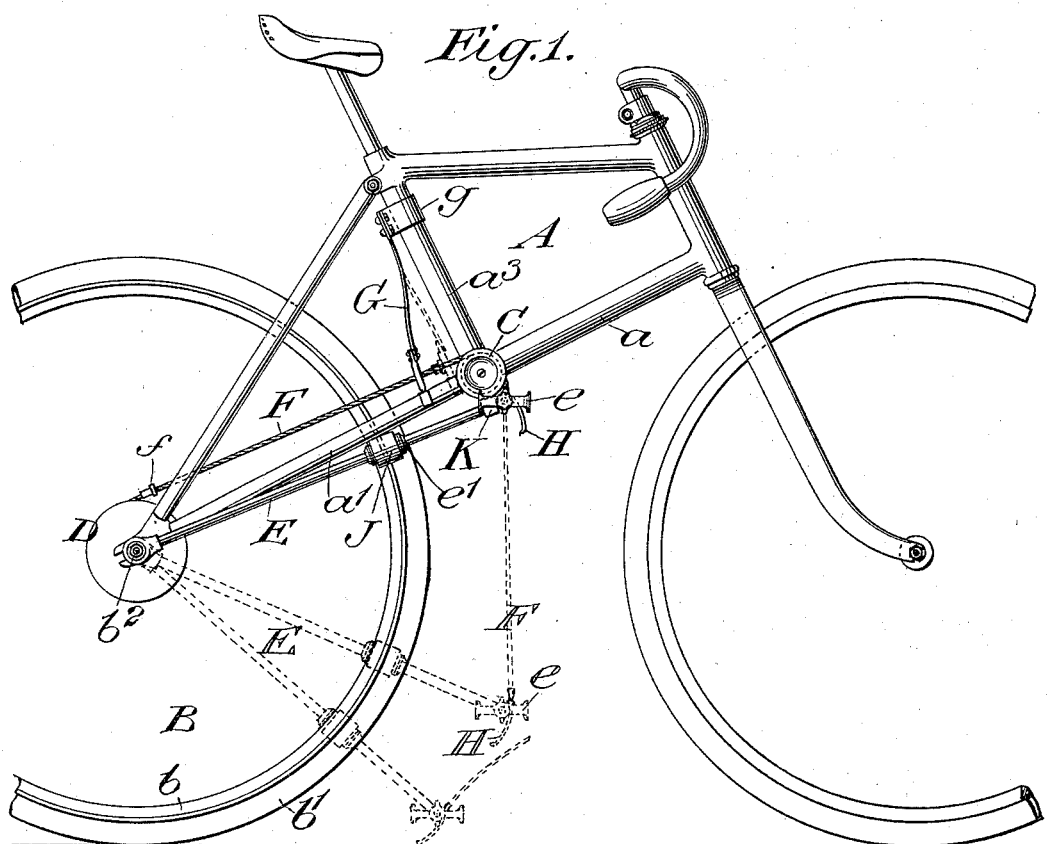
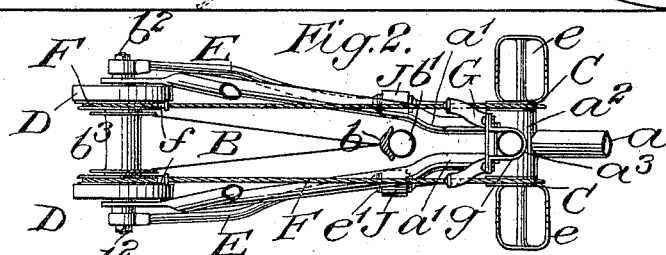
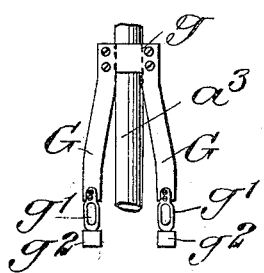
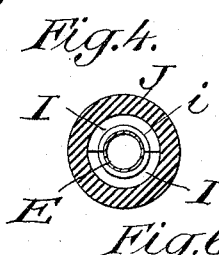
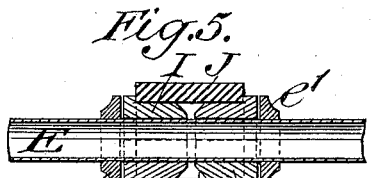
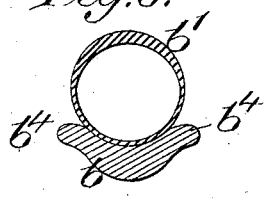
Witnesses:
George Barry Jr.
Fred Haynes
Inventor:
Alexander W. Hall
by attorneys No. 611,429. Patented Sept. 27, 1898.
A. W. HALL.
BICYCLE.
(Application filed Jan. 4, 1898.)
(No Model.) 2 Sheets—Sheet 2.
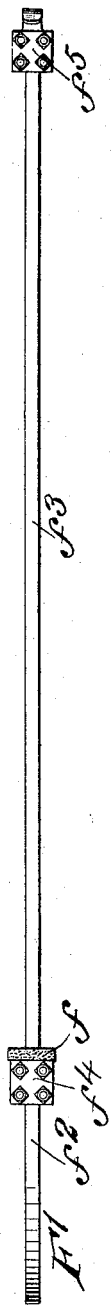
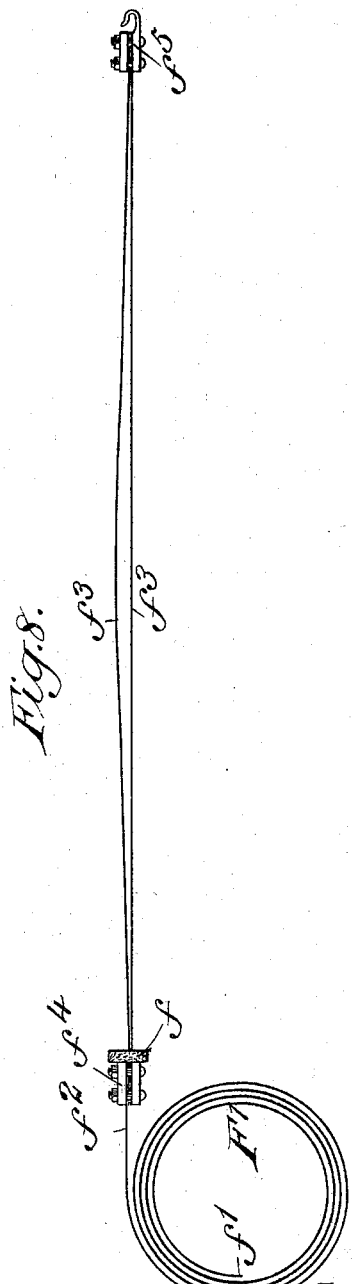
Witnesses:
George Barry Jr.
Fred Haynes
Inventor:
Alexander W. Hall
by attorneys

UNITED STATES PATENT OFFICE.

ALEXANDER W. HALL, OF NEW YORK, N. Y.

BICYCLE.

SPECIFICATION forming part of Letters Patent No. 611,429, dated September 27, 1898.

Application filed January 4, 1898. Serial No. 665,549. (No model.)

*To all whom it may concern:*

Be it known that I, ALEXANDER W. HALL, of New York, in the county and State of New York, have invented new and useful Improvements in Bicycles, of which the following is a specification.

My invention relates to certain improvements in bicycles, and more particularly to the mechanism employed for driving the same and for regulating their speed.

One object of my invention is to provide a driving mechanism which will be very simple and strong in construction and which will be capable of driving the bicycle at a high rate of speed with a minimum expenditure of force.

A further object is to provide means for effectually guarding against injury to the rider should the guide-bar be permitted to fall into contact with the ground by the breaking of the driving cord or strap.

Another object is to provide the guide-arms with frictional devices in position to engage the opposite sides of the rim of the rear wheel of the bicycle when so desired for retarding or stopping the bicycle.

A practical embodiment of my invention is represented in the accompanying drawings, in which—

Figure 1 represents a side view of a bicycle embodying my improvements, the guide-arm upon the right-hand side of the bicycle being shown in full lines at the limit of its upward movement and in dotted lines, first, at the limit of its downward movement and, secondly, with its guard in engagement with the ground in the position which it would assume if the driving strap or cord should break. Fig. 2 is a top plan view of the driving mechanism and portions of the bicycle. Fig. 3 is a rear view of the spring-actuated yielding stop for cushioning the latter portion of the downward movement of the guide-arms. Figs. 4 and 5 represent, on an enlarged scale, cross and longitudinal sections through a portion of one of the guide-arms, with its brake mechanism thereon. Fig. 6 is an enlarged cross-section indicating more clearly the extension of the opposite sides of the rim beyond the sides of the tire, and Figs. 7 and 8 represent top plan and side views of a modified form of driving-strap.

The bicycle-frame is denoted as a whole by A, the front lower brace $a$ and the rear lower braces $a'$ being shown in alinement, thereby bringing the bottom bracket $a^2$ up quite a distance from the ground and in line between the axle of the rear wheel and the connection of the front lower brace with the steering-head.

The rear wheel is denoted by B, its rim by $b$, its tire by $b'$, its axle by $b^2$, and its hub by $b^3$. A pair of idler-pulleys C are mounted in suitable bearings upon opposite sides of the bicycle at the bottom bracket $a^2$, the said pulleys being preferably provided with side flanges around their peripheries for retaining their driving straps or cords, to be hereinafter described.

A friction driving-clutch D is mounted at each side of the hub of the rear wheel B, the said clutches being arranged to drive the wheel forwardly when they are rotated in one direction and to permit the wheel to continue its forward movement when rotated in the other direction.

A pair of vertically-swinging guide-bars E, one upon each side of the bicycle, are pivoted at their rear ends upon the axle $b^2$ of the rear wheel exterior to the rear lower braces $a'$ of the frame. These guide-bars have a double bend a short distance forward from their pivots, whereby they are brought beneath the rear lower braces and in close proximity to the rim $b$ and tire $b'$ of the rear wheel. The free end of each of the guide-bars is provided with a suitable pedal $e$. These guide-bars are made preferably of tubular form and of spring metal, so that they may be sprung a slight distance inwardly for retarding the movement of the bicycle, in a manner to be hereinafter described.

A pair of driving cords or straps F are secured at their rear ends to the driving-clutches D, and extend from thence over and on the idler-pulleys C and have their forward ends secured to the free ends of the guide-bars E. The clutches D are provided with suitable retracting-springs (not shown) of sufficient force to reverse the outer members of the clutches and to wind the cords F around the clutches and normally hold the pedals and guide-bars at the limit of their upward movement.

The spring-actuated yielding stop for limiting the downward movement of the pedals comprises a pair of downwardly-extended spring-bars G, having at their upper ends a suitable collar or sleeve $g$, which is adapted to be secured rigidly around the seat-post tube $a^3$ of the bicycle-frame, and their lower ends each provided with a loop $g'$, through which the cord or strap F passes. These loops $g'$ are engaged by projections $f$, carried by the straps, just before the pedals reach their lowermost position. The further downward movement of the pedals forces the projections $f$ in engagement with the loops against the tension of the spring-bars G forwardly until they abut against the idler-pulleys C. These loops $g'$ are preferably provided with cushioned extensions $g^2$ for engaging the said idler-pulleys.

The spring-bars G are preferably made of such strength as to partially support the rider when the pedals are in their lowermost position, the extension of the said bars further tending to return the pedals a short distance upwardly when the rider's feet are raised.

The guards H are secured to the free ends of the guide-bars E, the said guards serving to cause the free end of the bar to travel along the surface of the ground in case the driving cord or strap F should break at a point between the projection $f$ and the pedal. This guard H is of spring material, preferably metal, and extends downwardly from the end of the guide-bar a short distance. The free end of the guard H will spring back slightly when meeting obstructions in the ground, and thereby permit the guide-bar to travel along the same without danger of throwing the rider.

The mechanism for regulating the speed of the bicycle is as follows: The sides of the rim $b$ of the rear wheel B are extended outwardly, as shown at $b^4$, beyond the side walls of the tire $b'$. Each of the guide-bars E is provided with a roller-brake located on the said guide-bars at a point opposite the rim $b$ of the wheel B. This roller-brake comprises a sectional spool I, having a free rotary movement upon the guide-bar E between the adjacent faces of a pair of flanged collars $e'$, secured permanently to the said guide-bar, and a flexible cylindrical casing J, fitted to the periphery of the said spool.

The spool I is divided transversely into two members having their inner adjacent ends beveled, as shown at $i$, whereby the depression of the yielding ring or cylindrical casing J by the engagement of the same with the side of the rim $b$ of the wheel B will force the two members outwardly, thereby causing their outer ends to snugly engage the adjacent faces of the flanged sleeves or collars $e'$. The two members of the spool I are further divided longitudinally into two sections, each for facilitating the assembling and removal of the parts. The roller-brake is brought into engagement with the said rim by the slight springing inwardly of the guide-bar E, which movement may be easily accomplished by the foot of the rider. The retarding effect of the brake is thus entirely under the control of the foot of the rider.

The free ends of the guide-bars are provided with cushioned stops or buffers K, which engage the idler-pulleys C when the guide-bars are at the limit of their upward movement. By permitting the free ends of the guide-bars to thus be stopped by the frame when in their uppermost position all strain is taken off the said guide-bars.

From the above description it will be seen that the spring-actuated yielding stop serves to cushion the latter part of the downward movement of the pedals, and when the stop has been forced forward until it is in engagement with the idler-pulleys the rider may stand upon the pedals, as his weight will be supported by the frame itself without any straining of the driving mechanism other than the driving cord or strap, and thereby relieve any portion of the weight required from the saddle.

By mounting the roller-brakes upon the guide-bars the said bars serve the double function of guides for the upward and downward movements of the pedals and also as levers for applying the said brakes to the rear wheel. The brake constructed as herein described may be applied at any part of the movement of the pedals.

In Figs. 7 and 8 I have shown a modified form of driving-strap, which consists of spring metal, in which the portion of the strap between the projection and the clutch is normally coiled and that portion between the projection and the pedal is normally straight.

The inner end $f'$ of the coiled portion F' of the strap may be suitably secured to the outer member of the clutch, and its outer end $f^2$ is clamped to the rear ends of a plurality of superposed metallic strips $f^3$ by means of a suitable clip $f^4$. These strips $f^3$ are normally straight and are provided at their forward ends with a suitable hook $f^5$ for attachment to the free end of the guide-bar E. The projection $f$ may be of yielding material, if so desired, and is located in close proximity to the clip $f^4$. The strips $f^3$ grow longer from the inner strip toward the outside, as clearly shown in Fig. 8, so that the said strips will bear an equal part of the strain when the strips are being bent around the idler-pulley C.

The portion F' of the strap tends to coil the spare portion of the strap at all times around the clutch as the strap is released from strain by the upward movement of the foot of the rider.

What I claim is—

1. In a bicycle, a suitable frame, a driving-wheel, a clutch mounted on the hub of the wheel, an idler-pulley mounted on the frame, a swinging guide-bar pivoted to the axle of the rear wheel, a driving-strap connecting the free end of the guide-bar with the clutch and passing over said idler-pulley and a cushioned stop carried by the guide-bar in position to come in contact with the idler-pulley when the said guide-bar is at the limit of its upward movement, substantially as set forth.

2. In a bicycle, a driving-wheel, a clutch carried thereby, an idler-pulley, a pedal, a driving strap or cord connecting the pedal with the clutch, a projection carried by the said strap or cord, and a spring-actuated yielding stop carried by the frame in position to engage the said projection before the pedal reaches the limit of its downward movement, the said stop being arranged to engage the frame to limit the downward movement of the pedal whereby the weight of the rider may be supported upon the pedal without straining the said spring-actuated stop, substantially as set forth.

3. In a bicycle, a driving-wheel, a clutch carried thereby, a swinging guide-bar, a strap or cord connecting the guide-bar with the clutch and a shoe carried by the guide-bar in position to travel along the ground if the cord or strap should break for preventing the further downward swinging movement of the guide-bar, substantially as set forth.

4. A roller-brake comprising a bar having a pair of collars permanently secured against outward movement thereon, a spool mounted to rotate on said bar between the said collars the said spool being divided transversely into two members having their adjacent ends beveled whereby the members may be moved outwardly away from each other, against the faces of the said collars by an inward pressure at the center of the spool, and a flexible cylindrical casing embracing the said spool, substantially as set forth.

5. A roller-brake comprising a bar having a pair of collars thereon fixed against outward movement relative to each other, a spool mounted to rotate upon the bar between the said collars, the spool being divided transversely into two members having their adjacent ends beveled whereby the members may be forced outwardly away from each other against the faces of the collars by an inward pressure at the center of the spool, the said spool being further divided longitudinally into sections and a flexible casing embracing the said spool for holding the parts assembled, substantially as set forth.

6. A spring-actuated yielding stop comprising a collar adapted to be secured to the frame of the bicycle, a pair of spring-bars having their upper ends secured to the collar and their lower ends provided with loops through which the driving cords or straps of the bicycle are adapted to pass, the said bars being further provided with cushioned stops for engaging the frame of the bicycle for limiting the movement of the stop in one direction, substantially as set forth.

7. A spring-actuated yielding stop comprising a collar adapted to be secured to the frame of the bicycle and a pair of downwardly-extended spring-bars having their lower ends provided with loops through which the driving cords or straps of the bicycle are adapted to pass, substantially as set forth.

ALEXANDER W. HALL.

Witnesses:
 FREDK. HAYNES,
 M. E. FLETCHER.